(12) United States Patent
Okita (10) Patent No.: US 9,031,743 B2
(45) Date of Patent: May 12, 2015

(54) COLLISION AVOIDANCE DEVICE (75) Inventor: Toshinori Okita, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 751 days.

(21) Appl. No.: 12/446,897

(22) PCT Filed: Mar. 26, 2008

(86) PCT No.: PCT/JP2008/056514
§ 371 (c)(1),
(2), (4) Date: Apr. 23, 2009

(87) PCT Pub. No.: WO2008/117885
PCT Pub. Date: Oct. 2, 2008

(65) Prior Publication Data
US 2010/0030426 A1 Feb. 4, 2010

(30) Foreign Application Priority Data

Mar. 27, 2007 (JP) ................. P2007-082334

(51) Int. Cl.
*B60T 7/22* (2006.01)
*B62D 5/04* (2006.01)
(Continued)

(52) U.S. Cl.
CPC ................. *B60T 7/22* (2013.01); *B62D 5/0463* (2013.01); *B60T 2201/022* (2013.01);
(Continued)

(58) Field of Classification Search
CPC ............ B06T 1/00; B06T 7/00; B60W 40/00; B62D 5/00; B62D 15/00
USPC .......... 701/36, 41–42, 51, 301; 180/6.2–6.24, 180/252, 271, 274, 280
See application file for complete search history.

(56) References Cited

U.S. PATENT DOCUMENTS 6,269,308 B1 * 7/2001 Kodaka et al. ................ 701/301
6,317,692 B2 * 11/2001 Kodaka et al. ................ 701/301
(Continued)

FOREIGN PATENT DOCUMENTS

DE 10 2005 039 167 A1 2/2007
EP 0 896 918 A2 2/1999
(Continued)

OTHER PUBLICATIONS

European Search Report issued in European Application No. 08739627.1 on Apr. 4, 2011.
(Continued)

Primary Examiner — John Q Nguyen
Assistant Examiner — Michael Ng
(74) Attorney, Agent, or Firm — Oliff PLC (57) ABSTRACT A collision avoidance ECU estimates a traveling locus based on an estimated curve radius of an own vehicle in a basic traveling locus estimating unit, and in a changed traveling locus estimating unit, obtains separation distances between an own vehicle and white lines based on the relative positional relationship between an own vehicle and the white lines, and estimates, as a changed traveling locus, a route along the white lines with the obtained separation distances maintained. In a collision judging unit, when auto-steering control and departure warning control are not performed, collision judgment is performed based on the basic traveling locus estimated in the basic traveling locus estimating unit, and when the auto-steering control and departure warning control are performed, the traveling locus is changed to the changed traveling locus estimated in the changed traveling locus estimating unit and collision judgment is performed.

13 Claims, 8 Drawing Sheets

(51) Int. Cl.
*B60W 30/09* (2012.01)
*B60W 40/072* (2012.01)
*B60W 40/076* (2012.01)
*B62D 15/02* (2006.01)

(52) U.S. Cl.
CPC ....... *B60T 2201/08* (2013.01); *B60T 2201/087* (2013.01); *B60W 30/09* (2013.01); *B60W 40/072* (2013.01); *B60W 40/076* (2013.01); *B60W 2420/52* (2013.01); *B62D 15/0265* (2013.01)

(56) References Cited

U.S. PATENT DOCUMENTS

| | | | |
|---|---|---|---|
| 6,317,693 B2 * | 11/2001 | Kodaka et al. | 701/301 |
| 6,370,474 B1 * | 4/2002 | Hiwatashi et al. | 701/300 |
| 7,209,833 B2 * | 4/2007 | Isaji et al. | 701/301 |
| 7,343,996 B2 * | 3/2008 | Klotz et al. | 180/169 |
| 7,418,346 B2 * | 8/2008 | Breed et al. | 701/301 |
| 7,440,830 B2 * | 10/2008 | Isaji et al. | 701/45 |
| 7,493,200 B2 * | 2/2009 | Takahashi et al. | 701/41 |
| 7,565,234 B2 * | 7/2009 | Noda et al. | 701/70 |
| 7,570,198 B2 * | 8/2009 | Tokoro | 342/70 |
| 2001/0018641 A1 * | 8/2001 | Kodaka et al. | 701/301 |
| 2004/0122573 A1 * | 6/2004 | Mizutani | 701/45 |
| 2004/0193347 A1 * | 9/2004 | Harumoto et al. | 701/45 |
| 2005/0090983 A1 * | 4/2005 | Isaji et al. | 701/301 |
| 2005/0125121 A1 * | 6/2005 | Isaji et al. | 701/36 |
| 2008/0189040 A1 * | 8/2008 | Nasu et al. | 701/301 |

FOREIGN PATENT DOCUMENTS

| | | |
|---|---|---|
| JP | A-10-264795 | 10/1998 |
| JP | A-2000-65928 | 3/2000 |
| JP | A-2001-114081 | 4/2001 |
| JP | A-2002-211430 | 7/2002 |
| JP | A-2004-78333 | 3/2004 |
| JP | B2-3588814 | 11/2004 |
| JP | A-2005-135025 | 5/2005 |
| JP | B2-3769938 | 4/2006 |
| JP | A-2006-327527 | 12/2006 |
| JP | A-2007-26289 | 2/2007 |

OTHER PUBLICATIONS

Japanese Office Action issued in Japanese Patent Application No. 2007-082334 on Jun. 8, 2010 (with translation).

Japanese Office Action issued in Japanese Patent Application No. 2007-082334 on Oct. 5, 2010 (with translation).

* cited by examiner

COLLISION AVOIDANCE DEVICE

TECHNICAL FIELD

The present invention relates to a collision avoidance device which avoids a collision of an own vehicle with an obstacle such as another vehicle.

BACKGROUND ART

In a conventional vehicle, when there is a probability that an own vehicle will collide with an obstacle around the vehicle, to avoid a collision, a collision avoidance device which controls traveling and issues a warning to drivers has been provided. As such a collision avoidance device, there is a steering stability controller disclosed in Japanese Published Unexamined Patent Application No. 2001-114081. This steering stability controller includes a collision judging device which judges whether a vehicle will collide with an obstacle by detecting the obstacle around the vehicle and a lane departure judging device which judges whether the vehicle will depart from a lane in which the vehicle is currently traveling by detecting the lane. In this steering stability controller even during steering stability control, when a collision judging device presumes that the vehicle will collide with an obstacle or depart from a lane, by stopping the steering stability control, the steering stability controller performs automatic control to avoid collision with an obstacle and departure from the lane.

DISCLOSURE OF THE INVENTION

In this type of collision avoidance device, it is desired to perform automatic control for avoiding a collision as quickly as possible, so that when an obstacle is distant from an own vehicle, it is demanded to judge an accurate collision probability with the obstacle. However, in the steering stability controller disclosed in Japanese Published Unexamined Patent Application No. 2001-114081, when the separation distance between an own vehicle and the obstacle is long, the accuracy in judgment of collision probability is not high, so that if collision avoidance control is performed at an early stage before a collision with an obstacle, unnecessary collision avoidance control increases and deteriorates traveling stability.

Even when a warning will be issued to a driver to avoid a collision, unless the collision probability judgment accuracy is high, many unnecessary warnings will be issued.

Therefore, an object of the present invention is to provide a collision avoidance device which can perform collision avoidance control early and issues a warning while preventing wasteful collision avoidance control and issues warnings by accurately judging the collision probability with an obstacle away from an own vehicle.

A collision avoidance device of the present invention which solves the above-described problem includes: an obstacle detecting means for detecting an obstacle; a collision judging means for judging the collision probability between an own vehicle and an obstacle from the relative relationship between the detected obstacle and an own vehicle; a collision avoidance means for performing collision avoidance control to avoid a collision between an own vehicle and an obstacle when the collision probability judged by the collision judging means is high; a road partitioning line detecting means for detecting road partitioning lines showing a traveling lane of an own vehicle around an own vehicle; a driving assisting means for assisting a driver so that an own vehicle travels in the traveling lane; and a judging method changing means for changing the method for judging the collision probability of the collision judging means in the case where the driver is assisted by the driver assisting means from the case where the driver is not assisted by the driver assisting means.

When driving assistance is performed by the driving assisting means, in comparison with the case where the driving assistance is not performed, the collision probability with an obstacle at a position far from an own vehicle can also be accurately judged. Here, the collision avoidance device of the present invention changes the method for judging the collision probability of the collision judging means when the driving assistance is performed by the driving assisting means in comparison with the case where driving assistance is not executed. Therefore, by accurately judging the collision probability with an obstacle far from an own vehicle, collision avoidance control can be performed early and a warning can be issued while preventing wasteful collision avoidance control and issuing warnings by accurately judging the collision probability.

Here, it is also possible that the driving assisting means is an auto-steering means for controlling steering of an own vehicle so that an own vehicle travels in the traveling lane. When the driving assisting means automatically controls steering, collision avoidance control can be performed early while preventing wasteful collision avoidance control.

Further, it is also possible that the driving assisting means is a warning control means for issuing a warning when the probability that an own vehicle departs from a traveling lane exceeds a predetermined threshold value. By the driving assisting means as a warning control means, a warning can be issued early while wasteful issuance of warnings can be prevented.

It is also possible that the collision avoidance device further includes a traveling locus estimating means for estimating a traveling locus of an own vehicle based on road partitioning lines showing the traveling lane of an own vehicle, and the collision judging means judges the collision probability based on the degree of deviation between an obstacle and the traveling locus of an own vehicle.

Thus, by judging the collision probability based on the degree of deviation between an obstacle and a traveling locus of an own vehicle, accurate collision judgment is realized.

Further, it is also possible that the collision judging means denies the collision probability between an obstacle positioned out of a region surrounded by the road partitioning lines showing the traveling lane of an own vehicle and an own vehicle.

Thus, by denying the collision probability between an obstacle positioned out of the region surrounded by the road partitioning lines showing the traveling lane of an own vehicle and an own vehicle, the calculation load to perform collision judgment can be reduced.

Other application ranges of the present invention will become clear from the following detailed description of the present invention. However, the detailed description and specific instances are shown by preferred embodiments of the present invention, and it is obvious that various variations and alterations within the spirit and scope of the present invention will be obvious to persons skilled in the art from this detailed description.

BEST MODES FOR CARRYING OUT THE INVENTION

Hereinafter, embodiments of the present invention will be described with reference to the accompanying drawings. In the description of the drawings, the same elements are attached with the same reference numerals, and overlapping description is omitted. For the sake of illustration, the dimensional ratio is not always equal to that of the description.

Figure 1:
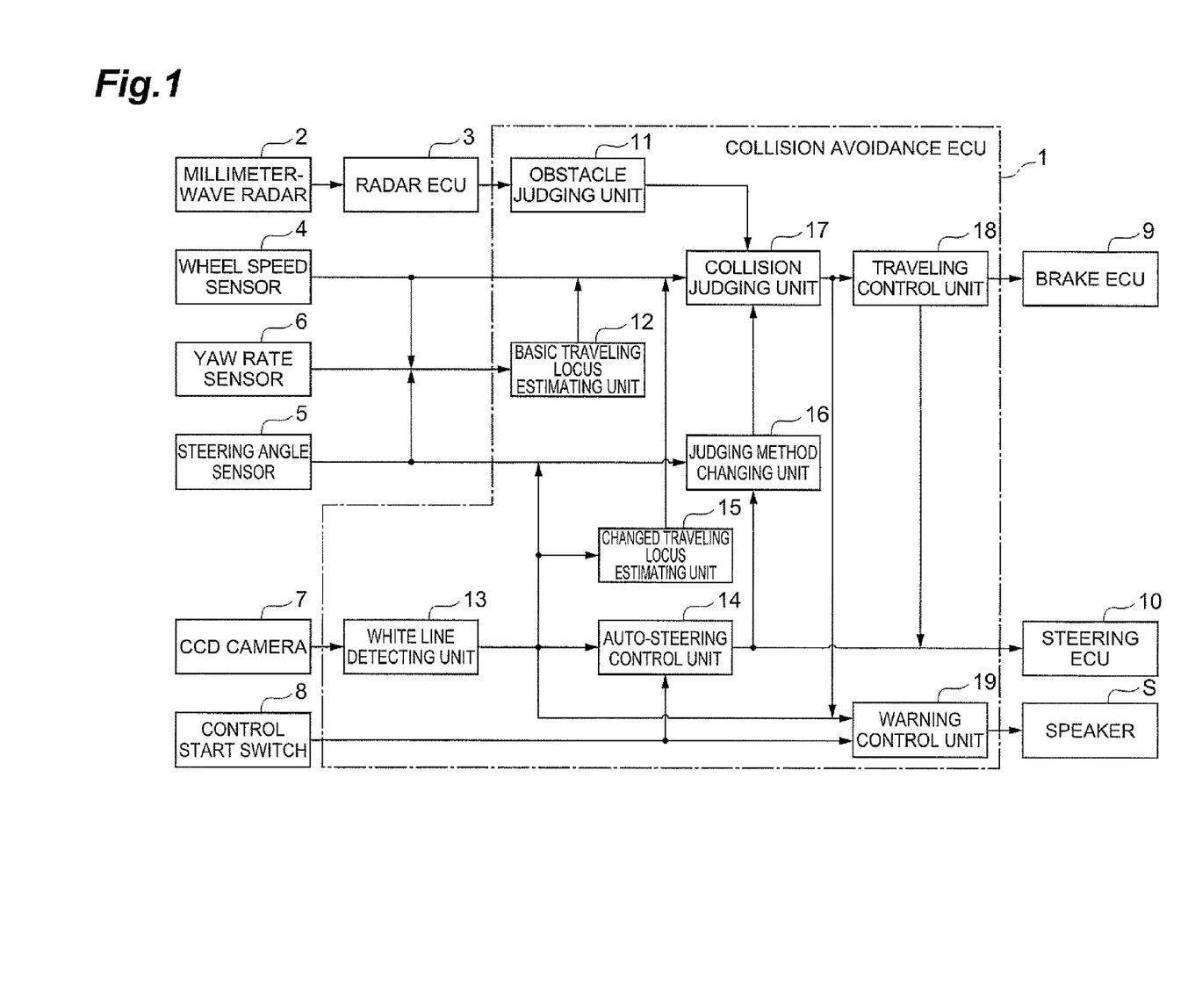
FIG. 1 is a block diagram showing a configuration of a collision avoidance device.

A first embodiment will be described. FIG. 1 is a block diagram showing a configuration of a collision avoidance device of the present embodiment. As shown in FIG. 1, the collision avoidance device of the present embodiment includes a collision avoidance ECU 1. To the collision avoidance ECU 1, a millimeter-wave radar 2 is connected via a radar ECU 3. Further, to the collision avoidance ECU 1, wheel speed sensors 4, a steering angle sensor 5, and a yaw rate sensor 6 are connected. To the collision avoidance ECU 1, a CCD camera 7 and a control start switch 8 are connected, and a brake ECU 9 and a steering ECU 10 are connected. The collision avoidance ECU 1 is connected to a speaker S.

The collision avoidance ECU 1, the radar ECU 3, the brake ECU 9, and the steering ECU 10 are computers of automotive devices to be electronically controlled, and include a CPU (Central Processing Unit), a ROM (Read Only Memory), a RAM (Random Access Memory), and an input/output interface, etc.

The collision avoidance ECU 1 includes an obstacle judging unit 11, a basic traveling locus estimating unit 12, a white line detecting unit 13, an auto-steering control unit 14, and a changed traveling locus estimating unit 15. The collision avoidance ECU 1 includes a judging method changing unit 16, a collision judging unit 17, a traveling control unit 18, and a warning control unit 19.

The millimeter-wave radar 2 is a radar for detecting an object by using a millimeter-wave. The millimeter-wave radar 2 is provided on the front side of the vehicle, transmits a millimeter-wave while scanning the millimeter-wave within a horizontal plane, and receives the reflected millimeter-wave. The millimeter-wave radar 2 transmits transmitting and receiving data of the received millimeter-wave as a radar signal to the radar ECU 3.

The radar ECU 3 detects an obstacle around an own vehicle based on the radar signal transmitted from the millimeter-wave radar 2. The radar ECU 3 transmits an obstacle signal to the obstacle judging unit 11 of the collision avoidance ECU 1 when an obstacle is detected around an own vehicle.

The wheel speed sensor 4 is a sensor which is provided for each wheel, and detects a wheel pulse of each wheel. Each wheel speed sensor 4 detects a wheel pulse and transmits the detected wheel pulse as a wheel pulse signal to the collision judging unit 17 of the collision avoidance ECU 1.

The steering angle sensor 5 is a sensor which detects a steering angle input from a steering wheel. The steering angle sensor 5 detects a steering angle, and transmits the detected steering angle as a steering angle signal to the basic traveling locus estimating unit 12 and the judging method changing unit 16 of the collision avoidance ECU 1.

The yaw rate sensor 6 is a sensor which detects a yaw rate to be applied to an own vehicle. The yaw rate sensor 6 detects a yaw rate, and transmits the detected yaw rate as a yaw rate signal to the basic traveling locus estimating unit 12 of the collision avoidance ECU 1.

The CCD camera 7 is provided at a front position of a vehicle, and images an image in a traveling direction of a vehicle. The CCD camera 7 transmits an imaged image to the white line detecting unit 13 of the collision avoidance ECU 1.

The control start switch 8 is a switch for switching into auto-steering and departure warning control, and when the control start switch 8 is turned ON, it transmits a control start signal to the auto-steering control unit 14 and the warning control unit 19 of the collision avoidance ECU 1.

The obstacle judging unit 11 of the collision avoidance ECU 1 judges whether there is an obstacle around an own vehicle based on the obstacle signal transmitted from the radar ECU 3. The obstacle judging unit 11 outputs the obstacle judgment results to the collision judging unit 17.

The basic traveling locus estimating unit 12 calculates an estimated curve radius of an own vehicle based on the steering angle signal transmitted from the steering angle sensor 5 and the yaw rate signal transmitted from the yaw rate sensor 6. In addition, the basic traveling locus estimating unit 12 estimates a basic traveling locus which is a reference traveling locus of an own vehicle based on the estimated curve radius obtained by calculation. The basic traveling locus estimating unit 12 outputs the estimated basic traveling locus of an own vehicle to the collision judging unit 17.

By applying image processing to an image transmitted from the CCD camera 7, the white line detecting unit 13 detects white lines as road partitioning lines inside the image. The white line detecting unit 13 outputs white line information based on the detected white lines to the auto-steering control unit 14, the changed traveling locus estimating unit 15, the judging method changing unit 16, and the warning control unit 19.

When an ON signal is transmitted from the control start switch 8, the auto-steering control unit 14 performs auto-steering control. The auto-steering control unit 14 performs steering control of the auto-steering device so as to prevent an own vehicle from departing from the inside of an own lane as a region surrounded by the white lines showing the traveling lane of an own vehicle, and performs lane keeping assistance for assisting a steering torque which assists a driver's steering operation. This auto-steering control unit 14 judges an own lane of an own vehicle defined inside the white lines based on white line information output from the white line detecting unit 13, and determines a steering angle of an own vehicle for traveling inside an own lane. The auto-steering control unit 14 transmits a steering angle signal based on the determined steering angle to the steering ECU 10. In addition, the auto-steering control unit 14 outputs auto-steering control execution information to the judging method changing unit 16 when auto-steering control is performed.

The changed traveling locus estimating unit 15 estimates a changed traveling locus of an own vehicle based on white line information output from the white line detecting unit 13. The changed traveling locus estimating unit 15 detects white lines based on the white line information, and detects the relative positional relationship between an own vehicle and the white lines. Based on the relative positional relationship between an own vehicle and the white lines, separation distances between an own vehicle and the white lines are obtained, and a route along the white lines with the separation distances maintained is estimated as a changed traveling locus. The changed traveling locus estimating unit 15 outputs the estimated changed traveling locus of an own vehicle and the white line information to the collision judging unit 17.

The judging method changing unit 16 judges whether auto-steering control execution information has been output from the auto-steering control unit 14. Further, the judging method changing unit judges whether the driver has operated steering based on the steering angle signal transmitted from the steering angle sensor 5. Further, the judging method changing unit 16 judges whether an own vehicle is inside the white lines based on the white line information output from the white line detecting unit 13. The judging method changing unit 16 judges whether the judging method is to be changed based on these information and judgment results, and when the judging method changing unit judges that the judging method is to be changed, it outputs a change signal to the collision judging unit 17.

The collision judging unit 17 performs collision judgment as to whether an own vehicle will collide with an obstacle based on the obstacle judgment result output from the obstacle judging unit 1 and the basic traveling locus of an own vehicle output from the basic traveling locus estimating unit 12, or the obstacle judgment result output from the obstacle judging unit 11 and the changed traveling locus transmitted from the changed traveling locus estimating unit 15. Based on whether the change signal has been transmitted from the judging method changing unit 16, it is judged which are used to perform collision judgment, the obstacle judgment result and the estimated traveling locus of an own vehicle or the obstacle judgment result and the changed traveling locus. The collision judging unit 17 outputs the collision judgment result to the traveling control unit 18 and the warning control unit 19.

As a result of the collision judgment output from the collision judging unit 17, when the collision probability is judged as high, the traveling control unit 18 performs collision avoidance control. When performing the collision avoidance control, the traveling control unit transmits collision avoidance control information to the brake ECU 9 and the steering ECU 10.

The warning control unit 19 composes a warning control means, and performs departure warning control and collision warning control. The warning control unit 19 performs departure warning control when an ON signal is transmitted from the control start switch 8. The warning control unit 19 judges an own lane of an own vehicle defined inside white lines based on white line information output from the white line detecting unit 13, and calculates the distance relationship between an own vehicle and the white lines. Further, the probability that an own vehicle departs from a traveling lane is judged based on the distance relationship between an own vehicle and the white lines, the wheel speed signals transmitted from the wheel speed sensors 4, the steering angle signal transmitted from the steering angle sensor, and the yaw rate signal transmitted from the yaw rate sensor 6, etc. In this judgment, it is judged whether the probability that an own vehicle departs from a traveling lane exceeds a predetermined threshold value, and when the probability that an own vehicle departs from a traveling lane is not more than the predetermined threshold value and when the probability of departure is low, a departure signal is not output. When the probability that an own vehicle departs from the traveling lane exceeds the predetermined threshold value and the probability of departure is judged as high, a departure signal is output to the speaker S. As a result of collision judgment output from the collision judging unit 17, when the collision probability is judged as high, a collision signal is output to the speaker S.

The brake ECU 9 is an ECU which controls a brake unit not shown of an own vehicle, and when the brake ECU receives a collision avoidance control signal of the collision avoidance ECU 1, it controls the brake unit so as to avoid a collision with an obstacle.

The steering ECU 10 is an ECU which controls an auto-steering device not shown of an own vehicle, and when the steering ECU receives a steering angle signal transmitted from the auto-steering control unit 14, it performs auto-steering of an own vehicle based on the received steering angle signal. In addition, when the steering ECU receives a collision avoidance control signal transmitted from the traveling control unit 18, it performs auto-steering of an own vehicle based on the received collision avoidance control signal. When the steering ECU receives both of the steering angle signal from the auto-steering control unit 14 and the collision avoidance control signal from the traveling control unit 18, it performs auto-steering of an own vehicle based on the collision avoidance control signal from the traveling control unit 18.

The speaker S is provided in, for example, the vehicle interior, and when a departure signal and a collision signal are output from the warning control unit 19, the speaker S outputs a departure warning and a collision warning.

Figure 2:
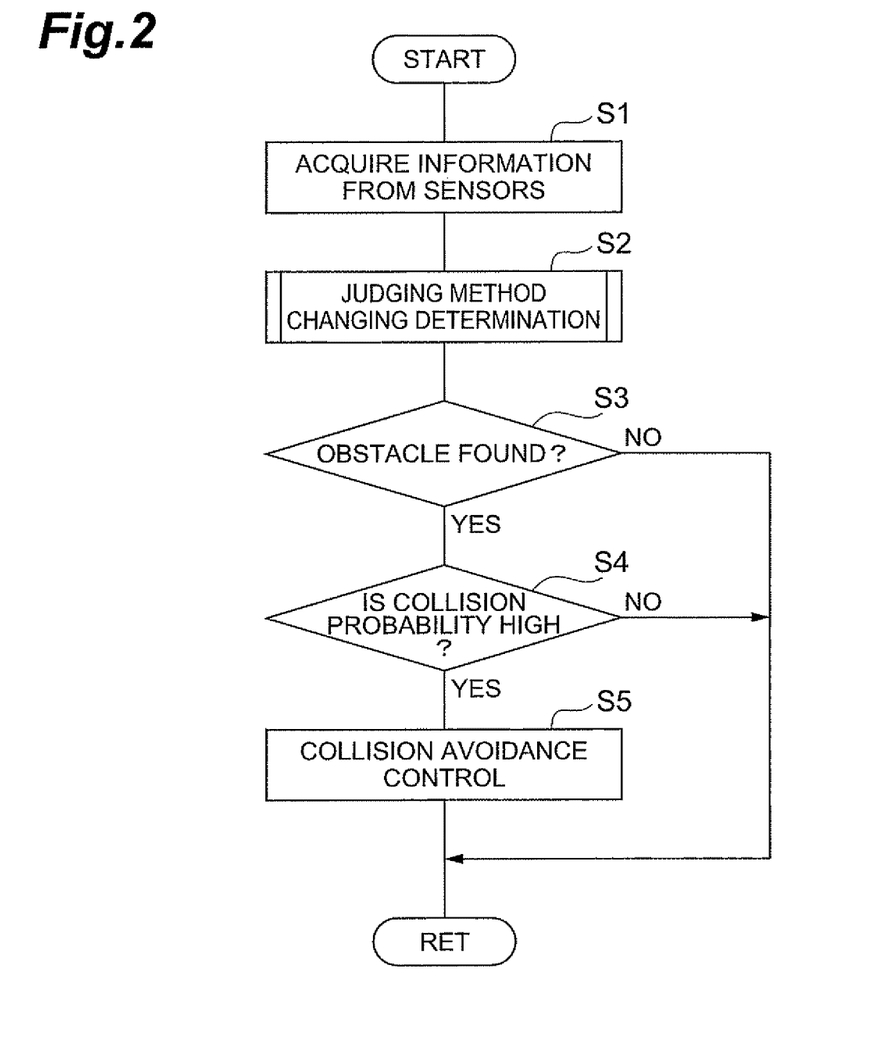
FIG. 2 is a flowchart showing control steps of a collision avoidance device of a first embodiment.

Next, control steps in the collision avoidance device of the present embodiment having the above-described configuration will be described with reference to FIG. 2. FIG. 2 is a flowchart showing control steps of the collision avoidance device of the present embodiment.

In the collision avoidance device of the present embodiment, first, signals from various sensors such as the millimeter-wave radar 2 via the radar ECU 3, the wheel speed sensors 4, the steering angle sensor 5, the yaw rate sensor 6, the CCD camera 7, and the control start switch 8 are received and acquired (S1). The basic traveling locus estimating unit 12 estimates the basic traveling locus of an own vehicle by calculation based on the steering angle signal transmitted from the steering angle sensor and the yaw rate signal transmitted from the yaw rate sensor 6, etc., outputs the estimation result to the collision judging unit 17. In addition, the white line detecting unit 13 detects white lines by applying image processing to an image transmitted from the CCD camera 7, and outputs the white line information based on the detected white lines to the auto-steering control unit 14, the changed traveling locus estimating unit 15, and the judging method changing unit 16. Further, the changed traveling locus estimating unit 15 estimates a changed traveling locus by calculation based on the output white line information, and outputs the estimated changed traveling locus of an own vehicle to the collision judging unit 17. Also, when an ON signal is transmitted from the control start switch 8, the auto-steering control unit 14 outputs auto-steering control execution information to the judging method changing unit 16, and based on the white line information output from the white line detecting unit 13, determines a steering angle of an own vehicle for traveling inside the white lines, and transmits a steering signal to the steering ECU 10.

Subsequently, the judging method changing unit 16 performs judging method changing determination (S2). The judging method changing determination is performed according to the steps of the flowchart of FIG. 3, and by this judging method changing determination, a traveling locus to be adopted for collision judgment is determined. As the traveling locus to be adopted for the collision judgment, the basic traveling locus output from the basic traveling locus estimating unit 12 is used in principle, however, when a change signal is output from the judging method changing unit 16, a changed traveling locus is used instead of the basic traveling locus.

Figure 3:
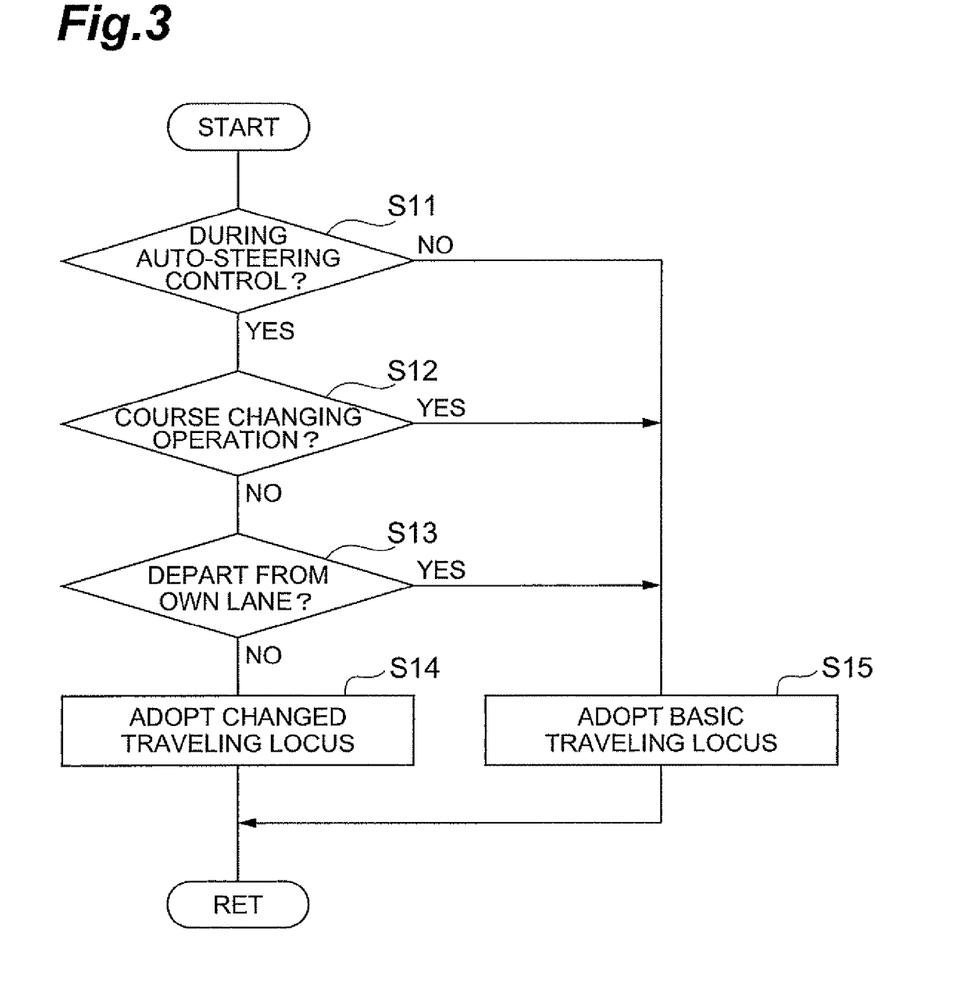
FIG. 3 is a flowchart showing steps of judging method changing determination.

Here, detailed steps of the judging method changing determination will be described. FIG. 3 is a flowchart showing steps of the judging method changing determination.

As shown in FIG. 3, in the judging method changing determination, first, it is judged whether auto-steering control or departure warning control has been performed (S11). The judgment as to whether auto-steering control or departure warning control has been performed depending on whether the control start switch 8 is ON. As a result, when the control start switch 8 is ON and it is judged that the auto-steering control or departure warning control has been performed, it is judged whether the driver has performed a course changing operation (S12). The judgment as to whether the driver has performed a course changing operation is performed depending on whether an indicator has been operated, and in the case where the indicator has been operated, it is judged that a course changing operation has been performed.

As a result, when the indicator is not operated and it is judged that a course changing operation has not been operated by the driver, it is judged whether an own vehicle departs from an own lane (S13). The judgment as to whether an own vehicle departs from an own lane is performed by comparing the relative positions of an own vehicle and the white lines based on the white line information output from the white line detecting unit 13. As a result, when it is judged that an own vehicle does not depart from an own lane, a change signal is output from the judging method changing unit 16 to the collision judging unit 17. In response to the output of the change signal, the collision judging unit 17 changes a traveling locus to be used for collision judgment from the basic traveling locus to the changed traveling locus, and performs collision judgment by using the changed traveling locus (S14).

When it is judged at Step S11 that the auto-steering control or departure warning output has not been performed, when it is judged at Step S12 that a course changing operation has been performed, and when it is judged at Step S13 that an own vehicle departs from an own lane, the traveling locus is not changed and the basic traveling locus is continuously adopted (S15) to perform collision judgment.

When the traveling locus to be adopted for the collision judgment is thus determined, the process returns to the flow of FIG. 2, and based on the obstacle signal transmitted from the radar ECU 3, the obstacle judging unit 11 detects the presence of an obstacle around an own vehicle (S3). As a result, when it is judged that no obstacle exists, the control by the collision avoidance device is directly ended.

Figure 4:
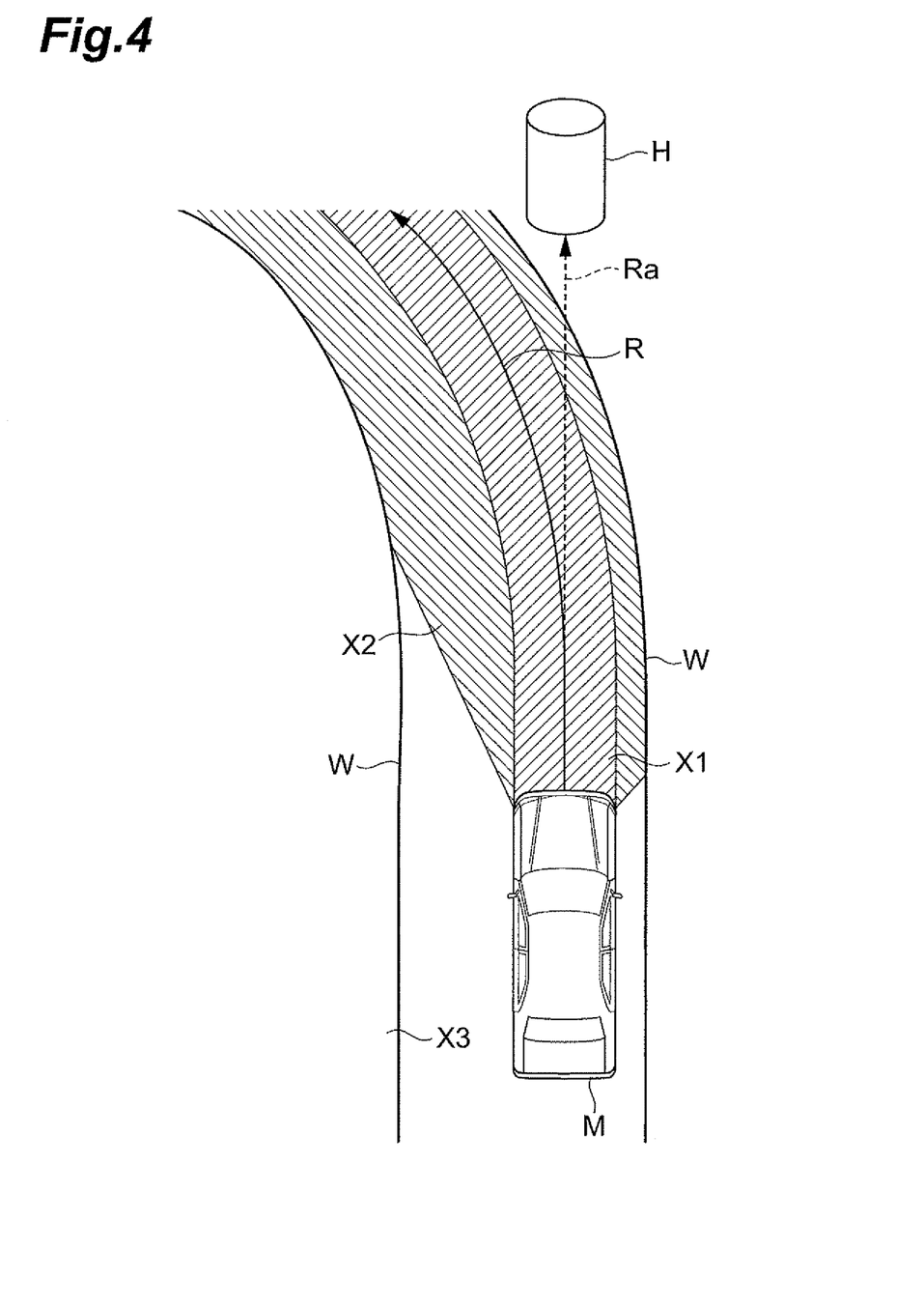
FIG. 4 is an explanatory view showing the relationship between an own vehicle and an obstacle.

On the other hand, when it is judged that an obstacle exists, the collision judging unit 17 performs collision judgment. In the collision judgment, it is judged whether the collision probability is high by comparing the determined traveling locus and the position of the obstacle (S4). Here, the collision judgment is performed based on the relative relationship between the detected obstacle and an own vehicle. As the detailed collision probability to be used for the collision judgment, the shortest distance which is the degree of deviation between the traveling locus of an own vehicle and the obstacle is obtained, and the shorter the shortest distance (the smaller the degree of deviation), the higher the collision probability. For example, as shown in FIG. 4, when the changed traveling locus R of an own vehicle M is obtained along the white lines W, around the changed traveling locus R, the region inside the vehicle width of an own vehicle M can be defined as a region X1 with a high collision probability, the region surrounded by the white lines can be defined as a region X2 with a medium collision probability, and the region outside the white lines can be defined as a region X3 with an extremely low collision probability.

Also, when the shortest distance between the traveling locus of an own vehicle and the obstacle is smaller than the predetermined threshold value, it can be judged that there is a collision probability. In this case, the predetermined threshold value can be adjusted according to the speed of an own vehicle, in detail, the predetermined threshold value of the shortest distance can be made smaller when the speed of an own vehicle is high.

As a result, when the collision probability is judged as high, the traveling control unit 18 performs collision avoidance control (S5), and transmits collision avoidance control information to the brake ECU 9 and the steering ECU 10. Also, when the collision probability is judged as not high, the control is ended without performing the collision avoidance control. Thus, the control by the collision avoidance device is ended.

Thus, in the collision avoidance device of the present embodiment, collision judgment is performed based on the relative relationship between an obstacle and an own vehicle. In this case, when an own vehicle performs auto-steering control, the collision probability judging method in the collision judgment is changed. In detail, the traveling locus to be used for the collision judgment is changed from the basic traveling locus to the changed traveling locus. The changed traveling locus is a traveling locus when an own vehicle travels inside an own lane inside the white lines, so that the traveling locus of an own vehicle can be accurately set at an early stage.

As shown in FIG. 4, for example, when a vehicle travels in a curved own lane, if auto-steering control is performed, the probability that an own vehicle M travels along the changed traveling locus R is high, and the collision probability with an obstacle H positioned out of the changed traveling locus R is low. However, the basic traveling locus estimated by the basic traveling locus estimating unit 12 is obtained based on an estimated curve radius, so that if collision judgment is performed based on the basic traveling locus, the collision probability between an own vehicle M and the obstacle H is judged as high.

For example, the basic traveling locus Ra is estimated based on an estimated curve radius, and becomes straight when an own vehicle M travels straight on a curve approach line, and the collision probability with the obstacle H is judged as high.

In this regard, the collision judging unit 17 determines which are used for the collision judgment, the obstacle judgment result or the changed traveling locus, based on a change signal output from the judging method changing unit 16, and when a change signal is output from the judging method changing unit 16, collision judgment is performed based on the changed traveling locus R estimated along the white lines W. By using this changed traveling locus R, the collision probability with the obstacle H positioned outside the white lines can be judged as low. Thus, by changing the traveling locus for collision judgment based on whether the auto-steering control is performed, the collision probability with an obstacle away from an own vehicle can be accurately judged, and as a result, collision avoidance control can be performed early while preventing wasteful collision avoidance control.

It is also possible that, concurrently with the collision avoidance control of Step S5, or instead of the collision avoidance control, the warning control unit 19 outputs a collision warning. By outputting a collision warning based on the judgment result in the collision judging unit 17, the collision probability with an obstacle away from an own vehicle can be accurately judged, and as a result, a collision warning can be issued early while preventing wasteful issuing of a collision warning.

Next, a second embodiment of the present invention will be described. A collision avoidance device of the present embodiment has a configuration similar to that of the first embodiment, and the steps of the judging method changing determination are mainly different from those of the first embodiment. Hereinafter, the present embodiment will be described by focusing on this difference.

Figure 5:
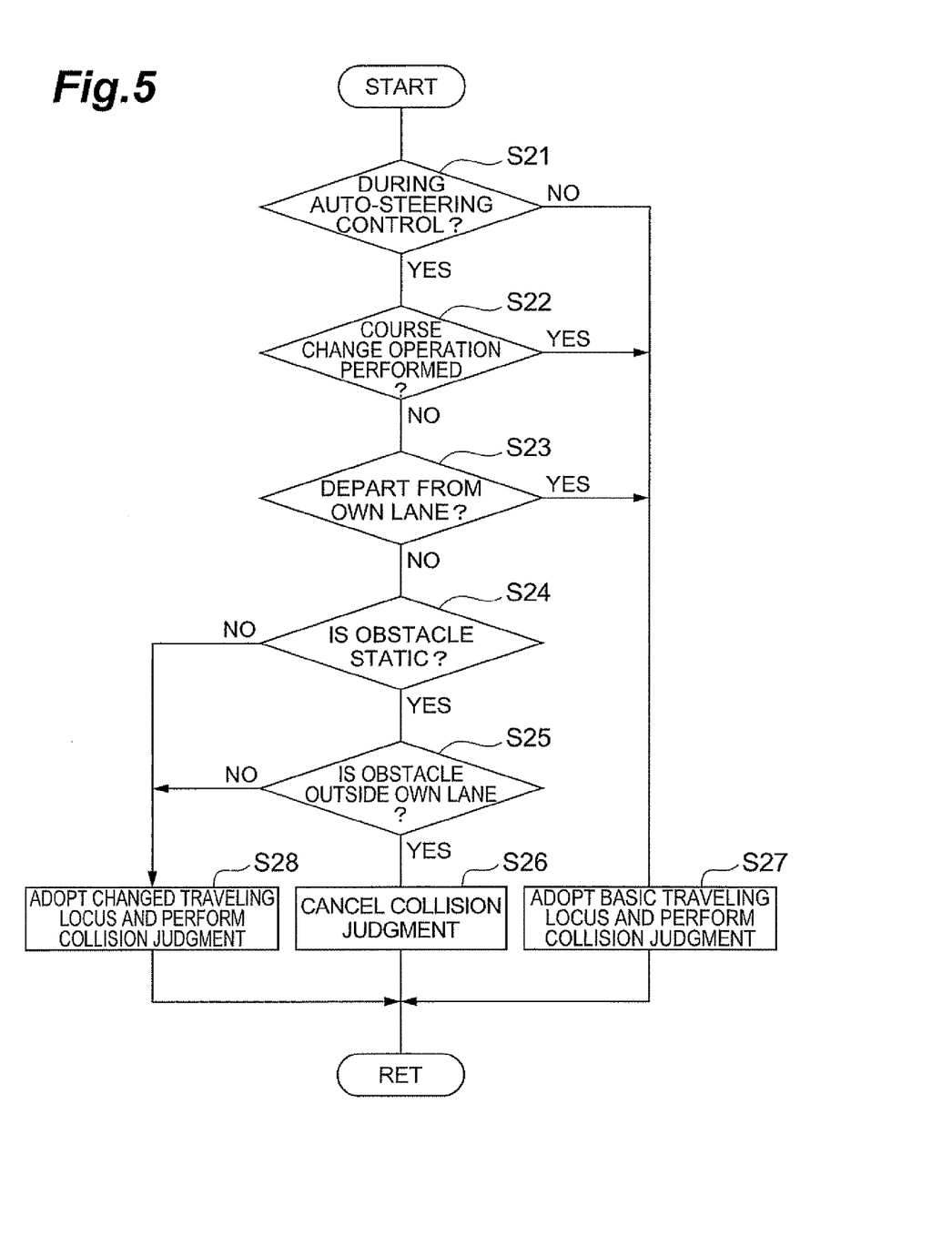
FIG. 5 is a flowchart showing steps of judging method changing determination in a collision avoidance device of a second embodiment.

FIG. 5 is a flowchart showing steps of judging method changing determination in the collision avoidance device of the second embodiment.

As shown in FIG. 5, in the judging method changing determination in the collision avoidance device of the present embodiment, it is judged whether auto-steering control or departure warning control has been performed through the same steps as in the first embodiment (S21). As a result, when it is judged that auto-steering control or departure warning control has been performed, it is judged whether the driver has performed a course changing operation (S22). As a result, when it is judged that a course changing operation has not been operated by the driver, it is judged whether an own vehicle departs from an own lane (S23). The steps so far are the same as in the first embodiment.

As a result of the judgment of Step S23, when it is judged that an own vehicle does not depart from an own lane, it is judged whether the obstacle judged by the obstacle judging unit 11 is a static object (S24). The judgment as to whether the obstacle is a static object is performed based on whether the positional relationship between the obstacle and an own vehicle moves by only a distance corresponding to a movement distance of an own vehicle when an own vehicle moves during elapse of a predetermined time.

As a result, when the obstacle is judged as a static object, it is judged whether the obstacle is positioned outside an own lane (S25). The judgment as to whether the obstacle is outside an own lane is performed based on the relative relationship between the position of the obstacle and the positions of the white lines. As a result, when the obstacle is judged as being outside an own lane, there is no probability that an own vehicle will collide with the obstacle, and the collision judgment is canceled (S26).

Figure 6:
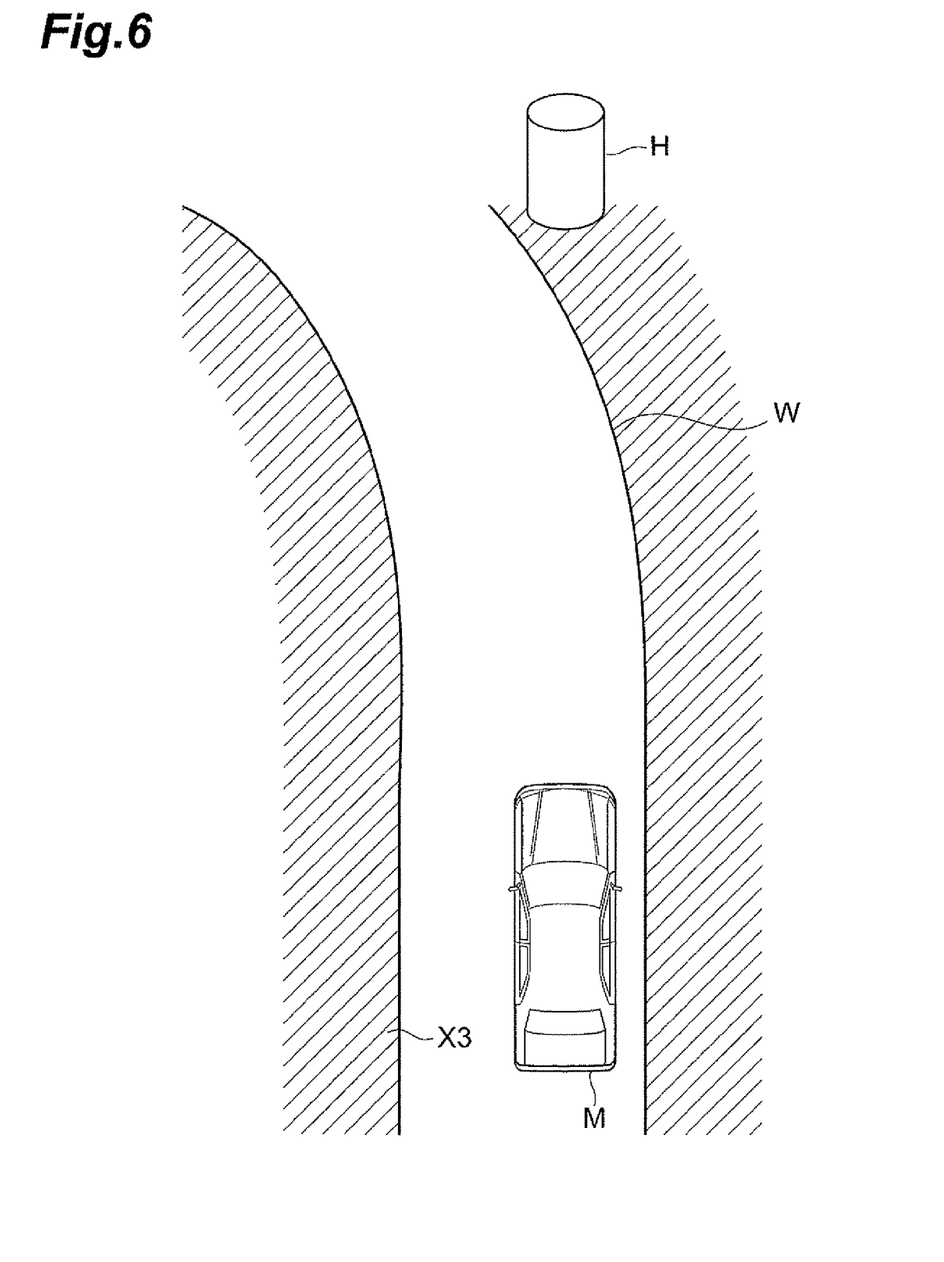
FIG. 6 is an explanatory view showing the relationship between an own vehicle and an obstacle.

During auto-traveling control, it is considered that an own vehicle never travels in a region out of an own lane. Therefore, as shown in FIG. 6, it can be judged that there is no probability that an own vehicle collides with an obstacle H positioned in the region X3 out of an own lane set inside the white lines W. Thus, by denying the probability that an own vehicle collides with an obstacle positioned in a region out of an own lane, the calculation load in collision judgment can be reduced.

In addition, when it is judged at Step S21 that auto-steering control or departure warning control have not been performed, when it is judged at Step S22 that a course changing operation has been performed, and when it is judged at Step S23 that an own vehicle departs from an own lane, in the same manner as in the first embodiment, without changing the traveling locus, the basic traveling locus is adopted and collision judgment is performed (S27). Also, when it is judged at Step S24 that the obstacle is not a static object and when it is judged at Step S25 that the obstacle is not outside an own lane (is inside an own lane), the probability that an own vehicle collides with an obstacle cannot be denied, so that the changed traveling locus is adopted to perform collision judgment (S28).

Thus, in the collision avoidance device of the present embodiment, as in the case of the above-described first embodiment, by changing the traveling locus in the case where the collision judgment is performed based on whether the auto-steering control has been performed, the collision probability with an obstacle away from an own vehicle can be accurately judged, and as a result, while wasteful collision avoidance control and issuance of collision warning are prevented, collision avoidance control can be performed and a warning can be generated early. Further, by denying the probability that an own vehicle collides with an obstacle positioned in a region out of an own lane, the calculation load in the collision judgment can be reduced.

Subsequently a third embodiment of the present invention will be described. Similar to the above-described second embodiment the present embodiment has a configuration similar to that of the above-described first embodiment, and in comparison with the above-described first embodiment, the steps of the judging method changing determination are mainly different. Hereinafter, the present embodiment will be described by focusing on this difference.

Figure 7:
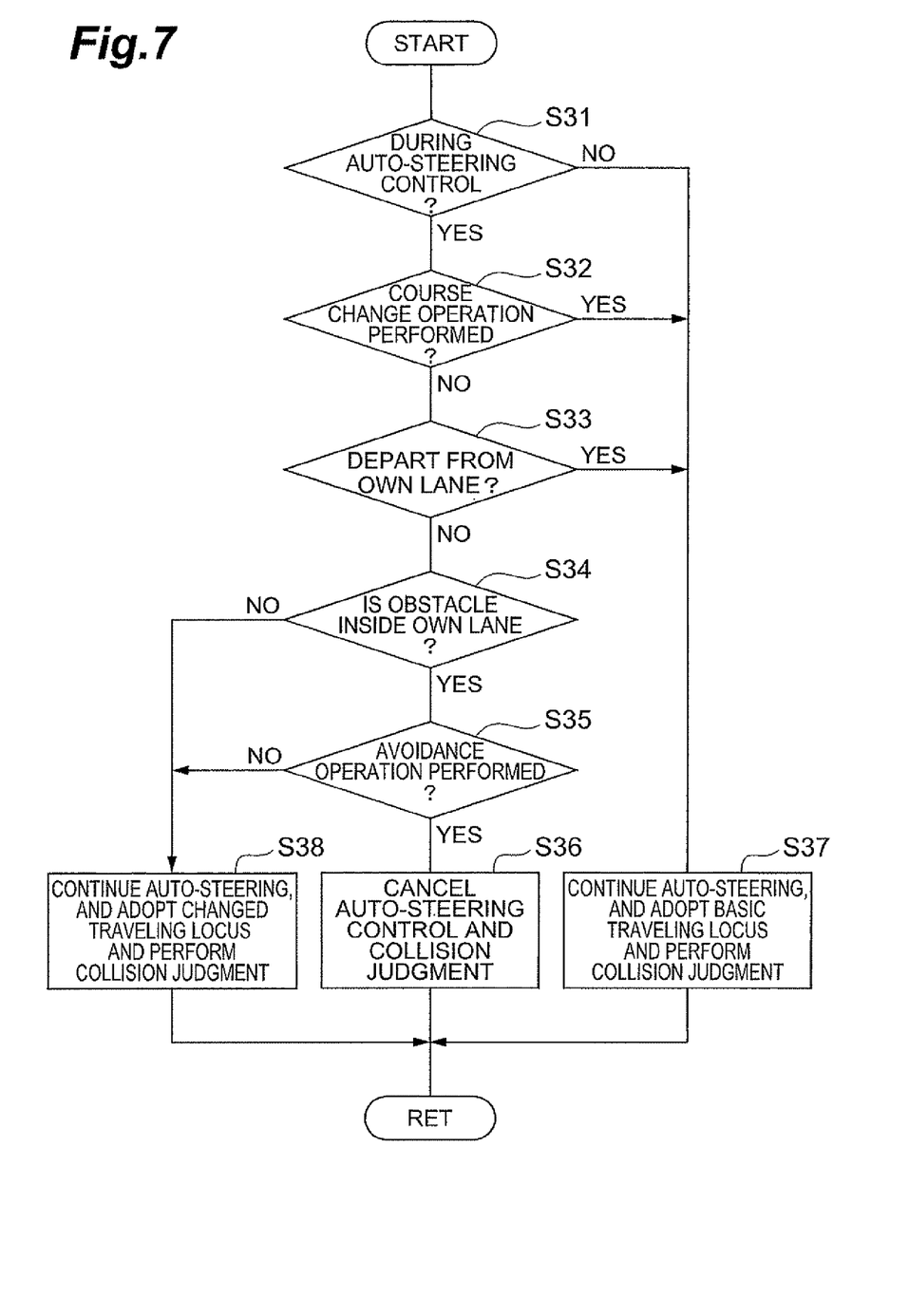
FIG. 7 is a flowchart showing steps of judging method changing determination in a collision avoidance device of a third embodiment.

FIG. 7 is a flowchart showing steps of judging method changing determination in a collision avoidance device of a third embodiment.

As shown in FIG. 7, in the judging method changing steps in the collision avoidance device of the present embodiment, it is judged whether auto-steering control or departure warning control has been performed through the same steps as in the above-described first embodiment (S31). As a result, when it is judged that auto-steering control or departure warning control has been performed, it is judged whether the driver has performed a course changing operation (S32). As a result, when it is judged that the driver has not performed the course changing operation, it is judged whether an own vehicle departs from an own lane (S33). The steps so far are the same as in the above-described first embodiment.

As a result of the judgment of Step S33, when it is judged that an own vehicle does not depart from an own lane, it is judged whether an obstacle exists inside an own lane (S34). The judgment as to whether an obstacle exists inside an own lane is performed based on the relative relationship between the position of the obstacle and the positions of the white lines.

As a result, when it is judged that an obstacle is inside an own lane, it is judged whether the driver has performed an avoidance operation for avoiding the obstacle (S35). The judgment as to whether the driver has performed an avoidance operation is performed based on whether a steering angle based on a steering angle signal transmitted from the steering angle sensor 5 exceeds a predetermined steering angle threshold value. As a result, when it is judged that the driver has performed an avoidance operation, it is estimated that the driver intends to perform steering by himself/herself, so that the auto-steering control and the collision judgment are canceled (S36).

Figure 8:
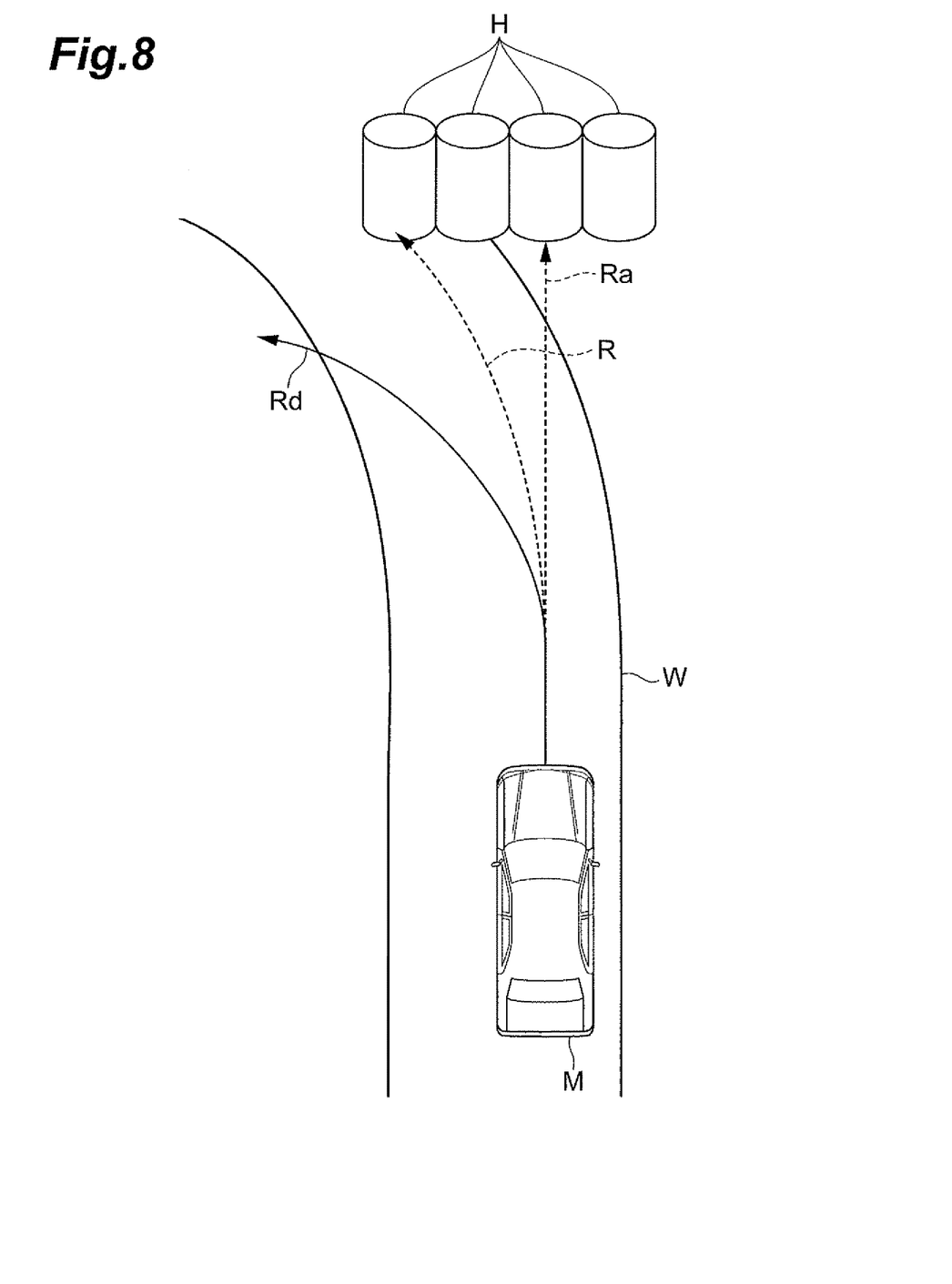
FIG. 8 is an explanatory view showing the relationship between an own vehicle and an obstacle.

When the auto-steering control is performed, steering of an own vehicle is left to the auto-steering device in principle, and without a steering operation by the driver, steering of an own vehicle is automatically performed. Here, in the case where the driver has performed an avoidance operation, it is considered that the driver steers an own vehicle so as to avoid an obstacle according to the driver's own will without relying on auto-steering. Here, the auto-steering control and collision avoidance control are likely to be canceled according to the driver's steering operation, however, if these controls are canceled according to only the steering operation, as shown in FIG. 8, in the worst case, an own vehicle M travels toward the obstacle H along the locus Ra. In addition, when the driver operates steering so as to avoid the obstacle H existing on the changed traveling locus R to try to move an own vehicle along the locus Rd, if the auto-steering control and collision avoid control are performed, these may make the driver feel a sense of discomfort. Therefore, the auto-steering control is canceled, and the collision avoidance control is also canceled by canceling the collision judgment. Thus, the driver can be prevented from feeling a sense of discomfort against the driver's steering operation.

Also, when it is judged at Step S31 that the auto-steering control or departure warning control has not been performed, when it is judged at Step S32 that a course changing operation has been operated, and when it is judged at Step S33 that an own vehicle departs from an own lane, the auto-steering control is continued, and as in the case of the above-described first embodiment, without changing the traveling locus, the basic traveling locus is adopted to perform collision judgment (S37). In addition, when it is judged at Step S34 that no obstacle exists inside an own lane and when it is judged at Step S35 that the avoidance operation has not been performed, the auto-steering control is continued and the changed traveling locus is adopted to perform collision judgment (S38).

Thus, in the collision avoidance device of the present embodiment, as in the case of the above-described first embodiment, by changing the traveling locus to be used for collision judgment based on whether the auto-steering control has been performed, the collision probability with an object away from an own vehicle can be accurately judged, and as a result, while wasteful collision avoidance control and issuance of collision warning are prevented, the collision avoidance control can be performed and a warning can be issued early. When a driver operates steering so as to avoid an obstacle existing inside an own lane, the driver can be prevented from feeling a sense of discomfort with the driver's steering operation.

Preferred embodiments of the present invention are described above, however, the present invention is not limited to the embodiments described above. For example, in the above-described embodiments, the auto-steering control and departure warning control are performed to assist the driver so that an own vehicle travels in the traveling lane, however, alternatively, one of these controls may be performed. As the auto-steering control, in addition to the lane keeping assistance for assisting the driver's steering operation by assisting the steering torque, complete auto-steering control in which the driver is not required to operate steering can also be adopted. To assist the driver, only one of these lane keeping assistance, complete auto-steering control, and departure warning control can be adopted, or these can be combined and adopted. Further, as a warning device, a speaker which informs a warning with sound is used, however, a lamp or a monitor, etc., which makes display attract the eyes can also be used.

In addition, in the embodiments described above, white lines are illustrated as road partitioning lines, however, the road partitioning lines may be something else. As another example of the road partitioning lines, lines colored in another color such as yellow lines or red lines, lines formed by aligning raised markers and stones, etc., or magnetic rails can also be used. Also, the road partitioning lines may be dotted lines instead of solid lines. Further, the road partitioning lines may be lines recognized in map data as well as lines actually drawn on a road.

INDUSTRIAL APPLICABILITY

The present invention can be applicable to a collision avoidance device which avoids a collision of an own vehicle with an obstacle such as another vehicle.

The invention claimed is:

1. A collision avoidance device that prevents wasteful collision avoidance control and wasteful issuance of warnings, the device comprising:
   a sensor to detect information around an own vehicle;
   an object detector to detect an object from the information;
   a lane detector to detect a traveling lane;
   a driving assisting unit that assists a driver so as to prevent the own vehicle from departing the lane;
   a collision judging unit that judges a collision probability between the own vehicle and the object;
   a judging method changing unit that changes a method for judging the collision probability by the collision judging unit;
   a collision avoidance unit that performs a control to avoid the collision;
   a warning control unit that issues a collision warning; and
   an electronic control unit having control logic which, when executed, determines whether the driver is assisted by the driving assisting unit, wherein:
      when the electronic control unit determines that the driver is assisted by the driving assisting unit, the judging method changing unit changes the method for judging the collision probability by the collision judging unit such that the collision judging unit then makes a determination that the collision probability between the own vehicle and an object outside the lane is low, and at least one of the warning control unit does not issue the collision warning and the collision avoidance unit does not perform the control to avoid the collision; and
      when the electronic control unit determines that the driver is not assisted by the driving assisting unit, the judging method changing unit changes the method for judging the collision probability by the collision judging unit such that the collision judging unit then makes the determination that the collision probability between the own vehicle and the object outside the lane is higher than when the electronic control unit determines that the driver is assisted by the driving assisting unit, and at least one of the warning control unit issues the collision warning and the collision avoidance unit performs the control to avoid the collision.

2. The collision avoidance device according to claim 1, wherein the driving assisting unit is the warning control unit, and the warning control unit issues a warning when the probability that the own vehicle departs from the traveling lane exceeds a predetermined threshold value.

3. The collision avoidance device according to claim 2, further comprising:
   a traveling locus estimating unit that estimates a traveling locus of the own vehicle based on road partitioning lines showing the traveling lane of the own vehicle, wherein the collision judging unit judges the collision probability based on the degree of deviation between the obstacle and the traveling locus of the own vehicle.

4. The collision avoidance device according to claim 3, wherein the collision judging unit denies the collision probability between the own vehicle and an obstacle positioned out of a region surrounded by the road partitioning lines showing the traveling lane of the own vehicle.

5. The collision avoidance device according to claim 2, wherein the collision judging unit denies the collision probability between the own vehicle and an obstacle positioned out of a region surrounded by road partitioning lines showing the traveling lane of the own vehicle.

6. The collision avoidance device according to claim 1, wherein the driving assisting unit is an auto-steering unit that controls steering of the own vehicle so that the own vehicle travels in the traveling lane.

7. The collision avoidance device according to claim 6, wherein the collision judging unit denies the collision probability between the own vehicle and an obstacle positioned out of a region surrounded by the road partitioning lines showing the traveling lane of the own vehicle.

8. The collision avoidance device according to claim 1, further comprising:
    a traveling locus estimating unit that estimates a traveling locus of the own vehicle based on road partitioning lines showing the traveling lane of the own vehicle, wherein
    the collision judging unit judges the collision probability based on a degree of deviation between the obstacle and the traveling locus of the own vehicle.

9. The collision avoidance device according to claim 8, wherein the collision judging unit denies the collision probability between the own vehicle and an obstacle positioned out of a region surrounded by the road partitioning lines showing the traveling lane of the own vehicle.

10. The collision avoidance device according to claim 6, further comprising:
    a traveling locus estimating unit that estimates a traveling locus of the own vehicle based on road partitioning lines showing the traveling lane of the own vehicle, wherein
    the collision judging unit judges the collision probability based on a degree of deviation between the obstacle and the traveling locus of the own vehicle.

11. The collision avoidance device according to claim 10, wherein the collision judging unit denies the collision probability between the own vehicle and an obstacle positioned out of a region surrounded by the road partitioning lines showing the traveling lane of the own vehicle.

12. The collision avoidance device according to claim 1, wherein the collision judging unit denies the collision probability between the own vehicle and an obstacle positioned out of a region surrounded by road partitioning lines showing the traveling lane of the own vehicle.

13. A method for preventing wasteful collision avoidance control and wasteful issuance of warnings, using a collision avoidance device that includes an electronic control unit having control logic that is configured to perform the method, the method comprising:
    detecting information around an own vehicle;
    detecting an object from the information;
    detecting a traveling lane;
    changing a method for judging a collision probability;
    judging the collision probability between the own vehicle and the object; and
    determining whether the driver is assisted by a driving assisting unit, wherein:
        when the electronic control unit determines that the driver is assisted by the driving assisting unit, the method for judging the collision probability is changed such that the collision probability between the own vehicle and the object outside the lane is low, and at least one of a warning control unit does not issue a collision warning and a collision avoidance unit does not perform a control to avoid the collision; and
        when the electronic control unit determines that the driver is not assisted by the driving assisting unit, the method for judging the collision probability is changed such that the collision probability between the own vehicle and the object outside the lane is higher than when the electronic control unit determines that the driver is assisted by the driving assisting unit, and at least one of the warning control unit issues the collision warning and the collision avoidance unit performs the control to avoid the collision.

* * * * *